Oct. 27, 1970  F. S. LOWNDES  3,535,815
FISH HOOK POSITIONING DEVICES
Filed Aug. 27, 1968
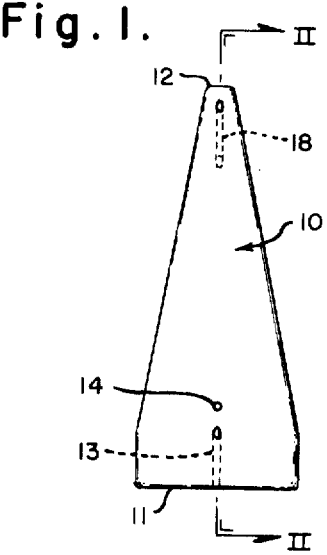
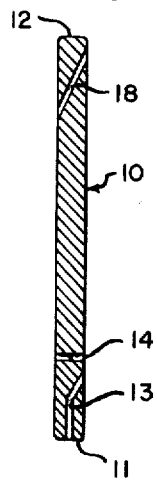
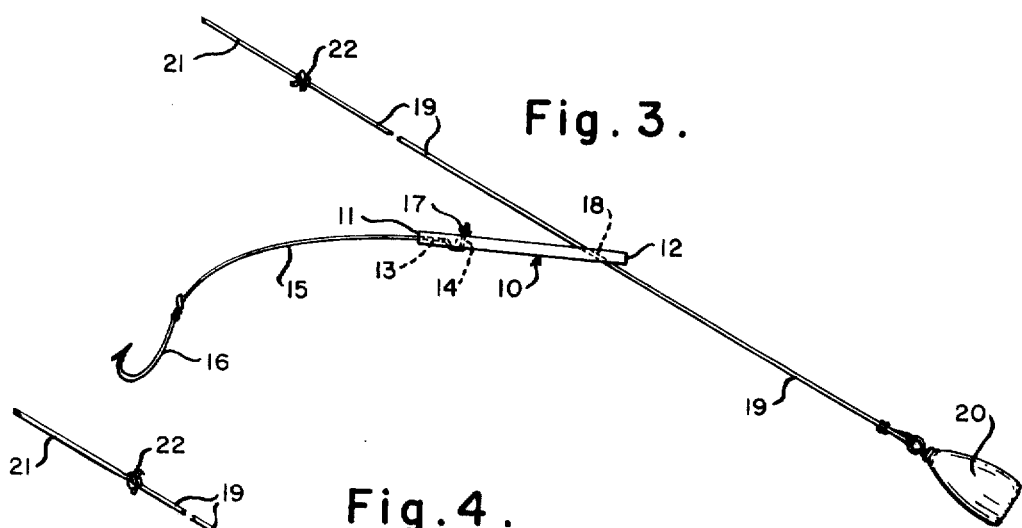
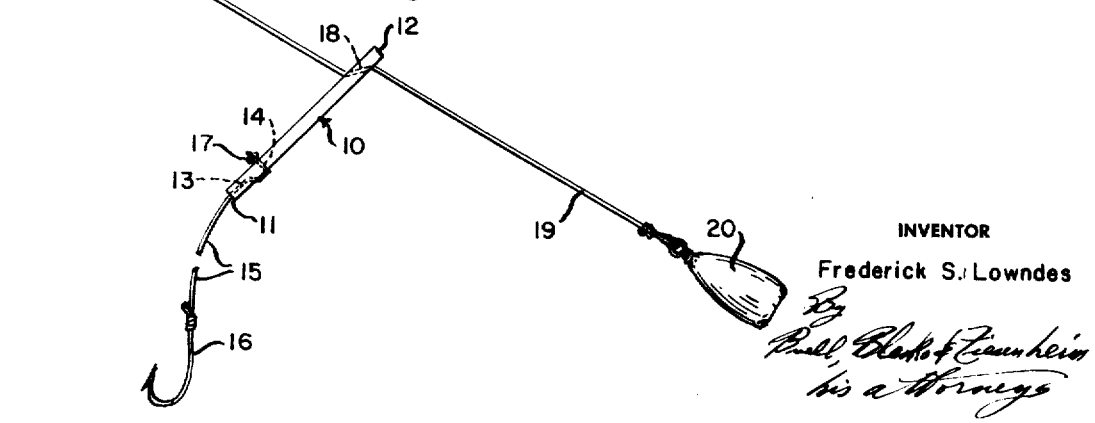
INVENTOR
Frederick S. Lowndes United States Patent Office 3,535,815
Patented Oct. 27, 1970

3,535,815
FISH HOOK POSITIONING DEVICES
Frederick S. Lowndes, 106 Tyler Road,
Pittsburgh, Pa. 15237
Filed Aug. 27, 1968, Ser. No. 755,559
Int. Cl. A01k 83/00
U.S. Cl. 43—44.85
5 Claims

ABSTRACT OF THE DISCLOSURE

A fish hook positioning device is provided in the form of an elongated control plate having a large surface area to thickness ratio, a drop line attaching means at one end of said plate and a fish line passage extending through the thickness of said plate at the other end at an angle to the plane of the plate.

---

This invention relates to fish hook positioning devices and particularly to hook carrying devices automatically positioned on the fish line by a combination of gravitational action and line control as hereafter more fully described.

It is well known that it is desirable, particularly when bait casting in lakes and streams, to be able to selectively position the fish hook and bait above the sinker which is normally on the end of the line. This positioning is normally done by fastening a hook on the line by means of a drop line or leader at a point remote from the sinker. This fixes the hook positively with respect to the sinker and is undesirable for a variety of reasons. First, it leaves a relatively long line carrying the sinker beyond the hook which is undesirable when casting. In order to get the maximum effectiveness in casting, it is desirable that the sinker and bait be close together at the end guide of the rod. This is not possible with such conventional practices.

Second, the hook and sinker are relatively fixed being always the same distance apart. This is not desirable where the water depth varies as it does from the shore towards the middle of a river or lake.

No one, so far as I am aware has successfully solved this problem. Many efforts have been made toward making adjustment of the hook position on the line easier, but in virtually all cases the hook, once positioned, remains the same with respect to the sinker. For example, Dunn 1,905,449 shows a friction clip for holding a drop line and hook positioned on a line spaced from a sinker. However, once positioned, the hook remains the same until manually moved. Hughes 1,970,752 shows another form of clip for accomplishing the same thing and with the same fixed positioning. Cianfrone Pat. 2,482,901 shows a drop line bracket in which the drop line is fixed to a clip which engages the line through a screw retainer. Here again the hook once positioned remains until manually repositioned. Kearns Pat. 3,164,922 shows another device in which beads are fixed to the line at intervals spaced from the sinker and a drop line plate with a keyhole slot is passed over the beads and positioned between a selected pair by drawing the narrow portion of the keyhole slot over the line. Here again the position of the hook is fixed manually. Yamada Pat. 2,857,704 shows a wave actuated device for carrying a hook along a fish line. In this device an outgoing wave carries the hook and bait with it along the line, when the motion of the water changes, the movement of the hook stops. By this device Yamada proposes to run successive hooks one after the other out of a fish line toward the sinker. Movement of the hook is completely at the mercy of the wave movement.

I have invented a device which makes it possible to automatically position a hook relatively to a sinker along a fish line so as to place it selectively along the line with respect to the sinker.

Preferably I provide an elongated control plate having a large surface area to thickness ratio, a drop line attaching means at one end of said plate and a fish line passage extending through the thickness of the plate at the other end at an angle to the plate. The control plate is preferably in the generally triangular form and of light metal such as aluminum. The hook attaching means is preferably midway along the base of the member and the angular line passage adjacent the apex. Preferably the line passage is at an angle of about 25° to the plane of the member although this angle may vary and still be effective as hereafter described.

In the foregoing general description, I have set out certain objects, purposes and advantages of my invention. Other objects, purposes and advantages will be apparent from a consideration of the following description and the accompanying drawings in which:

FIG. 1 is a top plan view of a device according to my invention;

FIG. 2 is a section on the line II—II of FIG. 1;

FIG. 3 is a side elevational view of a device according to my invention showing the device moving upwardly along the fish line as cast; and FIG. 4 is a side elevational view of a device according to my invention in the locked position as a result of drawing the fish line taut.

Referring to the drawings, I have shown a contrrol plate 10 of generally triangular form having a base 11 and apex 12. A passage 13 is drilled into base 11 and out through one flat surface of plate 10. A hole 14 is drilled through the plate adjacent passage 13. A snell or leader 15 having a hook 16 at one end is passed through passage 13 and hole 14 and the end 17 remote from hook 16 is knotted. A passage 18 is drilled through plate 10 adjacent apex 12 at an angle of about 25° to the plane of plate 10. A fish line leader 19 is passed through passage 18 and a sinker 20 attached to the end. The angle of the passage 18 is such that when the line is drawn taut, it will bend in generally Z shape through the passage as shown in FIG. 4. The leader 19 is connected to line 21 by a knot 22 or similar fastener which acts as the top limit for movement of plate 10.

To operate the device, the plate 10 and sinker 20 are brought together at the end guide of the casting rod and the cast is made in usual manner. As the line and sinker pass through the air, the plate 10 is pushed away from sinker 20 by the flotation or buoying effect of the air, the plate acting like a kite. When the sinker and plate strike the water, this differential buoyance or flotation effect between the sinker and control plate become even greater and the sinker and plate separate as shown in FIG. 3 rapidly. When the line is drawn taut, the control plate tends to drop at its base, thus bending the line and make frictional engagement therewith to hold the plate in position as shown in FIG. 4.

Loss of tackle and plate 10 can be prevented by fastening sinker 20 to the end of the fish line with a short piece of lighter test line so that if the sinker becomes snagged, the light line can be broken without damaging the tackle or losing the control plate, hook and bait.

While I have illustrated and described a presently preferred embodiment of my invention in the foregoing specification, it will be understood that this invention may be otherwise embodied.

I claim:

1. A fish hook positioning device for use on a fish line comprising an elongated control plate having a large surface area to thickness ratio, a drop line attaching means at one end of said plate and a fish line passage having a diameter slightly greater than a fish line extending through the thickness of the plate at the other end of said plate at an angle to the plane of the plate, said fish line passage beginning adjacent said other end and extending toward said one end, said line passing through said passage with the end of the line entering the water leaving the passage at the point toward said other end whereby the line moves freely through the passage when cast and is otherwise frictionally engaged by the passage.

2. A fish hook positioning device as claimed in claim 1 wherein the control plate is of generally triangular shape.

3. A fish hook position device as claimed in claim 2 wherein the line passage is adjacent the apex and the drop line attaching means is generally centrally of the base.

4. A fish hook positioning device as claimed in claim 1 wherein the control plate is aluminum.

5. A fish hook positioning device as claimed in claim 1 wherein the fish line passage is at an angle of about 25° to the plane of the control plate.

References Cited

UNITED STATES PATENTS

| | | | |
|---|---|---|---|
| 2,547,469 | 4/1951 | Husson | 43—42.49 X |
| 3,164,922 | 1/1965 | Kearns et al. | 43—44.85 X |

WARNER H. CAMP, Primary Examiner

U.S. Cl. X.R.

43—43.12